US008020191B2

(12) United States Patent
Bertino et al.

(10) Patent No.: US 8,020,191 B2
(45) Date of Patent: Sep. 13, 2011

(54) METHOD AND SYSTEM FOR DETERMINING POLICY SIMILARITIES

(75) Inventors: Elisa Bertino, West Lafayette, IN (US); Dan Lin, West Lafayette, IN (US); Jorge Lobo, New York, NY (US); Prathima Rama Rao, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 11/765,222

(22) Filed: Jun. 19, 2007

(65) Prior Publication Data

US 2008/0320549 A1    Dec. 25, 2008

(51) Int. Cl.
*G06F 17/00* (2006.01)
*H04L 29/06* (2006.01)
*G06F 15/173* (2006.01)
*G06F 3/00* (2006.01)
*G06F 13/00* (2006.01)
*H04N 5/445* (2011.01)

(52) U.S. Cl. .................. 726/1; 725/44; 725/45; 725/46; 709/224

(58) Field of Classification Search .................. None
See application file for complete search history.

(56) References Cited

U.S. PATENT DOCUMENTS

| 7,454,775 | B1* | 11/2008 | Schaffer et al. ............... 725/46 |
| 2002/0073195 | A1* | 6/2002 | Hellerstein et al. ........... 709/224 |
| 2002/0165842 | A1* | 11/2002 | Hellerstein et al. ............. 706/47 |
| 2004/0078386 | A1* | 4/2004 | Moon et al. ................... 707/102 |
| 2004/0088156 | A1* | 5/2004 | Kanagasabai et al. ............ 704/9 |
| 2005/0246350 | A1* | 11/2005 | Canaran ....................... 707/100 |
| 2008/0046929 | A1* | 2/2008 | Cho et al. ....................... 725/46 |
| 2008/0195587 | A1* | 8/2008 | Hussami .......................... 707/3 |
| 2008/0215518 | A1* | 9/2008 | Matsuda ......................... 706/47 |

* cited by examiner

*Primary Examiner* — Shin-Hon Chen
(74) *Attorney, Agent, or Firm* — F. Chau & Associates, LLC (57) ABSTRACT

A method for determining similarity of two policies includes providing a first policy with n rules and a second policy with m rules, wherein each rule is structured into a plurality of identifiable elements, categorizing the rules in each policy based on an action, for each pair of rules finding those predicates whose attribute names match, computing an attribute similarity score for the attribute values, summing the attribute similarity scores for all pairs to obtain an element similarity score, and computing a rule similarity score for the pair of rules from a weighted sum of said element similarity scores.

28 Claims, 5 Drawing Sheets

FIGURE 1

```
PolicyId=P2
    <PolicyTarget>
        <Subject GroupName belong_to{IBMOpen-
                    Collaboration, IntelOpenCollaboration}>
    </PolicyTarget>
    <RuleId=R21 Effect=Permit>
        <Target>
            <Subject Designation belong_to{Student,
                            Faculty, TechnicalStaff} >
            <Action AccessType belong_to{Read, Write}>
        </Target>
        <Condition FileSize ≤ 120MB >
    </Rule>
    <RuleId=R22 Effect=Permit>
        <Target>
            <Subject Designation=TechnicalStaff>
            <Action AccessType belong_to{Read, Write}>
        </Target>
        <Condition 19:00 ≤ Time ≤ 22:00 >
    </Rule>
    <RuleId=R23 Effect=Deny>
        <Target>
            <Subject Designation=Student>
            <Action AccessType=Write>
        </Target>
        <Condition {19:00 ≤ Time ≤ 22:00}>
    </Rule>
    <RuleId=R24 Effect=Deny>
        <Target>
            <Subject Designation belong_to{Student,
                            Faculty, Staff}>
            <Resource FileType=Media>
            <Action AccessType belong_to{Read, Write}>
        </Target>
    </Rule>
```

Figure 3: Resource Owner Policy $P_2$

```
PolicyId=P3
    <PolicyTarget>
        <Subject GroupName = Payroll >
    </PolicyTarget>
    <RuleId=R31 Effect=Permit>
        <Target>
            <Subject Designation=BusinessStaff>
            <Resource FileType="*.xls" >
            <Action AccessType belong_to{Read, Write}>
        </Target>
        <Condition 8:00 ≤ Time ≤ 17:00,
                    FileSize ≤ 10MB >
    </Rule>
    <RuleId=R32 Effect=Deny>
        <Target>
            <Subject Designation=Student>
            <Action AccessType belong_to{Read, Write}>
        </Target>
    </Rule>
```

Figure 4: Resource Owner Policy $P_3$

```
PolicyId=P1
    <PolicyTarget>
        <Subject GroupName=IBMOpenCollaboration>
    </PolicyTarget>
    <RuleId=R11 Effect=Permit>
        <Target>
            <Subject Designation belong_to{Professor,
                        PostDoc, Student, TechnicalStaff} >
            <Resource FileType belong_to{Source,
                        Documentation, Executable} >
            <Action AccessType belong_to{Read, Write} >
        </Target>
        <Condition FileSize ≤ 100MB >
    </Rule>
    <RuleId=R12 Effect=Deny>
        <Target>
            <Subject Designation belong_to{Student,
                        PostDoc, TechnicalStaff} >
            <Resource FileType belong_to{Source,
                        Documentation, Executable}>
            <Action AccessType=Write>
        </Target>
        <Condition 19:00 ≤ Time ≤ 21:00>
    </Rule>
```

Figure 2: Data Owner Policy $P_1$

METHOD AND SYSTEM FOR DETERMINING POLICY SIMILARITIES

TECHNICAL FIELD

This disclosure is directed to the comparison of security policies in collaborative computing applications.

DISCUSSION OF THE RELATED ART

The foundation of collaborative applications is the sharing of resources, such as services, data, and knowledge. Such applications can have different objectives, such as provisioning some complex service to a third party or performing collaborative data analysis, and may adopt different collaboration mechanisms and tools. However, a common requirement is the need to assure security for shared resources. It is important that the collaboration does not undermine the security of the collaborating parties and their resources. However, security should not drastically reduce the benefits deriving from the collaboration by severely restricting the access to the resources by the collaborating parties. A question that a party P may need to answer when deciding whether to share a resource with other parties is whether these other parties guarantee the same level of security as P. This is a complex question and the first step to answering this question requires the comparison of access control policies among resources. Access control policies are security, privacy and system management policies stored in semi-structured form in computers. Access control policies govern access to protecting resources by stating which subjects can access which data for which operations and under which circumstances. During collaborations, a party P may decide to release some data to a party $P_0$ only if the access control policies of $P_0$ are very much the same as P's own access control policies. Having P just sending its policies together with data to $P_0$ so that $P_0$ can directly enforce these policies may not always work. The evaluation of P's policies may require accessing some additional data that may not be available to $P_0$ for various reasons, for example, confidentiality, or P may not be willing to share its policies with $P_0$.

More complex situations arise when several alternative resources and services, each governed by its own independently administered access control policies, have been selected and combined in a complex service. In order to maximize the number of requests that can be satisfied by the complex service at the same time satisfying the access control policies of each participating resource and service, it is desired to select for combination the resources and services characterized by access control policies that are similar. As an example consider the case of a grid computing system, consisting of data owners and resource owners, each with its own access control policies. For a subject to be able to run a query on the data, this subject must verify both the access control policy associated with the queried data and the access control policy of the resource to be used to process the query. It is often the case that such parties do not have exactly the same access control policies; therefore in order to maximize the access to the data, it is important to store the data for processing at the resource having access control policies similar to the access control policies associated with the data.

A trivial solution for computing policy similarity is represented by a brute force approach, that is, one simply evaluates both policies for any request and any assignment, and then compare the results. This approach is inefficient and even infeasible when the request domain is infinite.

Most current policy comparison work is performed manually since existing approaches to policy similarity analysis are limited and based mainly on logical reasoning and Boolean function comparison. Such approaches are computationally expensive and do not scale well for large heterogeneous distributed environments. One practical approach based on model checking analyses role-based access-control policies written in the extensible Access Control Markup Language XACML. This approach represents policies using a multi-terminal binary decision diagram and is able to verify policy properties and analyze differences between versions of policies. Another algorithm for checking refinement privacy policies checks if one policy is a subset of another policy. Another category of relevant work is directed to policy conflict detection. One approach investigates interactions among policies and proposes a ratification tool by which a new policy is checked before being added to a set of policies. This approach determines the satisfiability of Boolean expressions corresponding to different policies. Another recent approach to computing policy similarity is limited to identifying policies specifying the same attribute.

SUMMARY OF THE INVENTION

Exemplary embodiments of the invention as described herein generally include methods and systems for computing a policy similarity score for two policies. If the similarity score of policies P1 and P2 is higher than that of policies P1 and P3, it means that P1 and P2 may yield the same decisions to a larger common request set than P1 and P3. The policy similarity measure can serve as a filter before applying any additional logical reasoning or Boolean function comparison. It can provide a useful lightweight approach to pre-compile a list of policies and return the most similar policies for further exploration. Such exploration could foe a fine-grained policy analysis which identifies the common or differing parts of two policies, and can also include a visualization phase where users can identify the similar policies and make their own decisions.

BRIEF DESCRIPTION OF THE DRAWINGS

FIG. 2 is an exemplary data owner policy, according to an embodiment of the invention.

FIGS. 3-4 are exemplary resource owner policies, according to an embodiment of the invention.

DETAILED DESCRIPTION OF EXEMPLARY EMBODIMENTS

Exemplary embodiments of the invention as described herein generally include systems and methods for determining policy similarities. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

A method according to an embodiment of the invention can efficiently compute a similarity score. Because of its generality a similarity measure can be designed for policies written in XACML (Extensible Access Control Mark-up Language). The method here can be easily adapted to cover many other types of policies, written, for example, in P3P, or the Imperial College policy language Ponder. The similarity measure takes into account the policy structure and semantic information like attribute hierarchies. Given two polices, the method for computing the similarity score first groups the same components of the two policies, and evaluates their similarity by using hierarchy distance and numerical distance. Then the scores obtained for the different components of the policies are combined according to a weighted combination in order to produce an overall similarity score.

Figure 1:
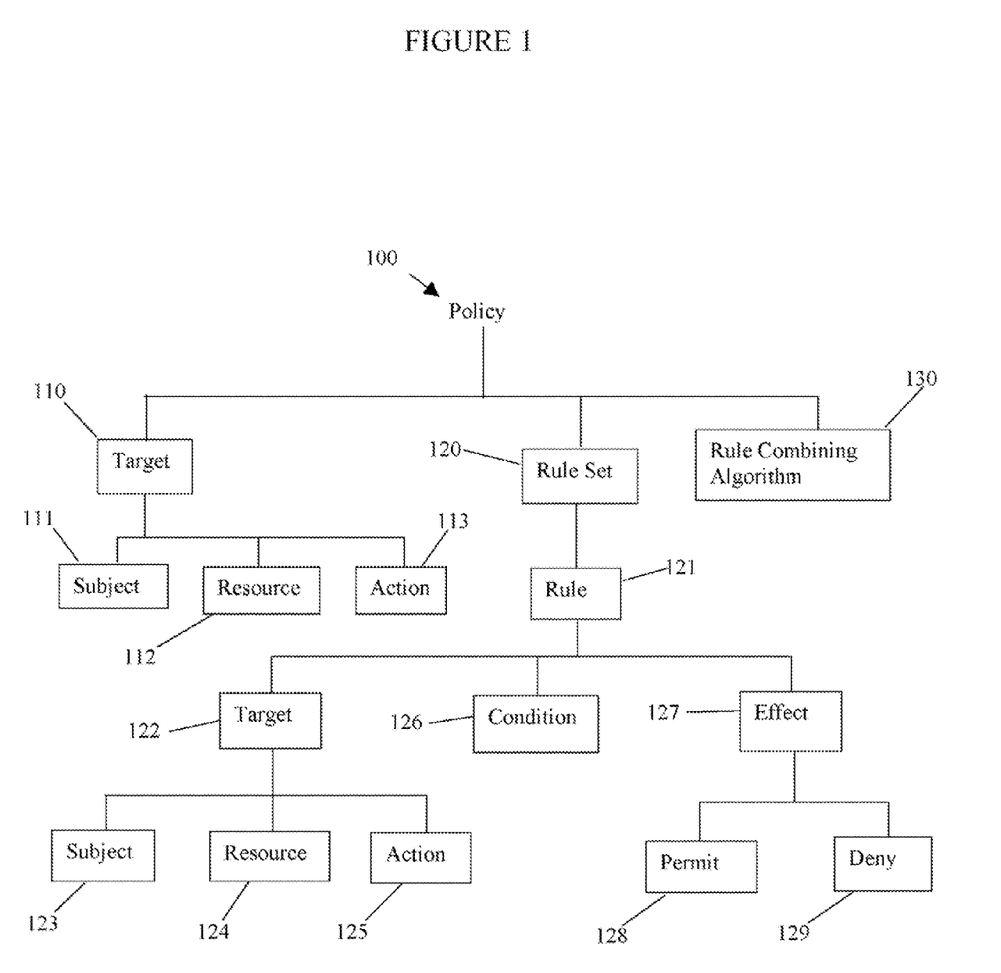
FIG. 1 depicts the structure of an XACML policy, according to an embodiment of the invention.

FIG. 1 depicts the structure of an exemplary XACML policy, according to an embodiment of the invention. An XACML policy 100 includes three major components, namely a Target 110, a Rule set 120, and a rule combining algorithm 130 for conflict resolution. The Target 110 specifies some predicates on the attribute values in a request, which must be held in order for the policy to be applicable to the request. The attributes in the Target element are categorized as Subject 111, Resource 112, and Action 113. These fields are optional, and not all fields are illustrated in the policy examples depicted, in FIGS. 2, 3, and 4. A Rule set includes one or more Rules 121. Only one rule is illustrated in the figure for clarity. Each Rule 121 in turn includes Target 122, Condition 126, and Effect 127 elements. The rule Target has the same structure as the policy Target, and includes a Subject 123, Resource 124, and Action 125. The only difference is that the rule Target specifies the situation when the rule can be applied. The policy target can be thought as a global target applying to each rule. A Condition 126 element specifies some restrictions on request attribute values that must be satisfied in order to yield a Permit 128 or Deny 129 decision as specified by the Effect 127 element. The policy similarity measure described below is based on the comparison of each corresponding component of the policies being compared. Here, the corresponding component refers to policy targets and the same type of elements belonging to the rules with the same effect.

As an example that will be used in this disclosure, consider three policies $P_1$, $P_2$ and $P_3$, in the context of data and resource management for a grid computing system in a university domain. In particular, $P_1$ is a data owner policy depicted in FIG. 2, whereas $P_2$ and $P_3$ are resource owner policies illustrated in FIGS. 3 and 4. Specifically, $P_1$ states that professors, postdocs, students and technical staff in an industry project group are allowed to read or write source, documentation or executable files of size less than 100 MB. $P_1$ denies the write operations for postdocs, students and technical staff between 19:00 and 21:00 hours because professors may want to check and make changes to the project files without any distraction. $P_2$ is an access control policy of a project machine. $P_2$ allows students, faculty and technical staff in the industry project group to read or write files of size less than 120 MB. $P_2$ gives a special permission to technical staff between time 19:00 and 22:00 hours so that technical staff can carry out system maintenance and backup files, and denies students the permission to write any file when technical staff is possibly working on maintenance. Moreover, $P_2$ does not allow any user to operate on media files on the machine. $P_3$ is an access control policy for another machine, mainly used by business staff. $P_3$ states that only business staff in the group named "Payroll" can read or write .xls files of size less than 10 MB from 8:00 to 17:00 hours, and it clearly denies students the access to the machine. FIGS. 2, 3 and 4 report the XACML specification for these policies. It is to be understood that these policies are exemplary and illustrative, and other embodiments of the invention are not limited to these policies or the particular setting.

From a user's perspective, $P_1$ is more similar to $P_2$ than $P_3$ because most activities described by $P_1$ for the data owner are allowed by $P_2$. It is desired to quickly compute similarity scores $S_1$ between $P_1$ and $P_2$, and $S_2$ between $P_1$ and $P_3$, where one would expect that $S_1$ be larger than $S_2$ to indicate that the similarity between $P_1$ and $P_2$ is much higher than the similarity between $P_1$ and $P_3$.

The policy similarity measure between any two given policies should assign a similarity score that approximates the relationship between the sets of requests permitted (denied) by the two policies. The similarity score is a value between 0 and 1, which reflects how similar these rules are with respect to the targets they are applicable to and also with respect to the conditions they impose on the requests. For example, in a scenario where a set of requests permitted (denied) by a policy $P_1$ is a subset of requests permitted (denied) by a policy $P_2$, the similarity score for policies $P_1$ and $P_2$ must be higher than the score assigned in a scenario in which the set of requests permitted (denied) by $P_1$ and $P_3$ have very few or no request in common.

Similarity Scores:

Given two policies $P_1$ and $P_2$, the rules in these policies are first grouped according to their effects, which results in a set of Permit Rules (denoted as PR) and a set of Deny Rules (denoted as DR). Each single rule in $P_1$ is then compared with a rule in $P_2$ that has the same effect, and a similarity score of two rules is obtained. The similarity score obtained between the rules is then used to find one→many mappings (denoted as Φ) for each rule in the two policies. For clarity, four separate Φ mappings $\Phi_1^P$, $\Phi_1^D$, $\Phi_2^P$ and $\Phi_2^D$ are used. The mapping $\Phi_1^P$ ($\Phi_1^D$) maps each PR(DR) rule $r_{1i}$ in $P_1$ with one or more PR(DR) rules $r_{2j}$ in $P_2$. Similarly the mapping $\Phi_2^P$ ($\Phi_2^D$) maps each PR(DR) rule $r_{2j}$ in $P_2$ with one or more PR(DR) rules $r_{1i}$ in $P_1$. For each rule in a policy $P_1(P_2)$, the Φ mappings give similar rules in $P_2(P_1)$ which satisfy a certain similarity threshold. The computation of the Φ mappings will be described in detail below.

By using the Φ mappings, one can compute the similarity score between a rule and a policy. One can find how similar a rule is with respect to the entire policy by comparing the single rule in one policy with a set of similar rules in the other policy. The notation $rs_{1i}(rs_{2j})$ denotes the similarity score for a rule $r_{1i}(r_{2j})$ in policy $P_1(P_2)$. The rule similarity score $rs_{1i}$ ($rs_{2j}$) is the average of the similarity scores between a rule $r_{1i}(r_{2j})$ and the rules similar to it given by the Φ mapping. $rs_{1i}$ and $rs_{2j}$ are computed according to the following expressions:

$$rs_{1i} = \begin{cases} \dfrac{\sum\limits_{r_j \in \Phi_1^P(r_{1i})} S_{rule}(r_{1i}, r_j)}{|\Phi_1^P(r_{1i})|}, & r_{1i} \in PR_1 \\ \dfrac{\sum\limits_{r_j \in \Phi_1^D(r_{1i})} S_{rule}(r_{1i}, r_j)}{|\Phi_1^D(r_{1i})|}, & r_{1i} \in DR_1, \end{cases} \qquad (1)$$

$$rs_{2j} = \begin{cases} \dfrac{\sum\limits_{r_i \in \Phi_2^P(r_{2j})} S_{rule}(r_{2j}, r_i)}{|\Phi_2^P(r_{2j})|}, & r_{2j} \in PR_2 \\ \dfrac{\sum\limits_{r_i \in \Phi_2^D(r_{2j})} S_{rule}(r_{2j}, r_i)}{|\Phi_2^D(r_{2j})|}, & r_{2j} \in DR_2, \end{cases} \qquad (2)$$

where $S_{rule}$ is a function that assigns a similarity score between two rules, and $|\Phi()|$ represents the cardinality of the particular set of $\Phi$ mappings.

Next, the similarity score is computed between the permit (deny) rule sets $PR_1(DR_1)$ and $PR_2(DR_2)$ of policies $P_1$ and $P_2$ respectively. The notations $S_{rule-set}^P$ and $S_{rule-set}^D$ are used to denote the similarity scores for permit and deny rule sets respectively. The similarity score for a permit(deny) rule set is obtained by averaging the rule similarity scores (EQS. 1 and 2) for all rules in the set. The permit and deny rule set similarity scores are formulated as follows:

$$S_{rule-set}^P = \dfrac{\sum\limits_{i=1}^{N_{PR_1}} rs_{1i} + \sum\limits_{i=1}^{N_{PR_2}} rs_{2j}}{N_{PR_1} + N_{PR_2}}, \qquad (3)$$

$$S_{rule-set}^D = \dfrac{\sum\limits_{i=1}^{N_{DR_1}} rs_{1i} + \sum\limits_{i=1}^{N_{DR_2}} rs_{2j}}{N_{DR_1} + N_{DR_2}}, \qquad (4)$$

where $N_{PR_1}$ and $N_{PR_2}$ are the numbers of rules in $PR_1$ and $PR_2$ respectively, $N_{DR_1}$ and $N_{DR_2}$ are the numbers of rules in $DR_1$ and $DR_2$ respectively.

Finally, the similarity scores for permit and deny rule sets between the two policies are combined with a similarity score between the Target elements of the two policies, to develop an overall similarity score, $S_{policy}$. The formulation of $S_{policy}$ is given by the following equation:

$$S_{policy}(P_1, P_2) = w_T S_T(P_1, P_2) + w_P S_{rule-set}^P + w_d S_{rule-set}^D, \qquad (5)$$

where $S_T$ is a function that computes a similarity score between the Target elements of any two given policies, and $W_T$ is the associated weight; $w_p$ and $w_d$ are weights that can be chosen to reflect the relative importance to be given to the similarity of permit and deny rule sets respectively. For normalisation, purpose, the weight values should satisfy the constraint: $w_T + w_p + w_d = 1$.

The intuition behind the similarity score assigned to any two policies is derived from the fact that two policies are similar to one another when the corresponding policy elements are similar.

Figure 5:
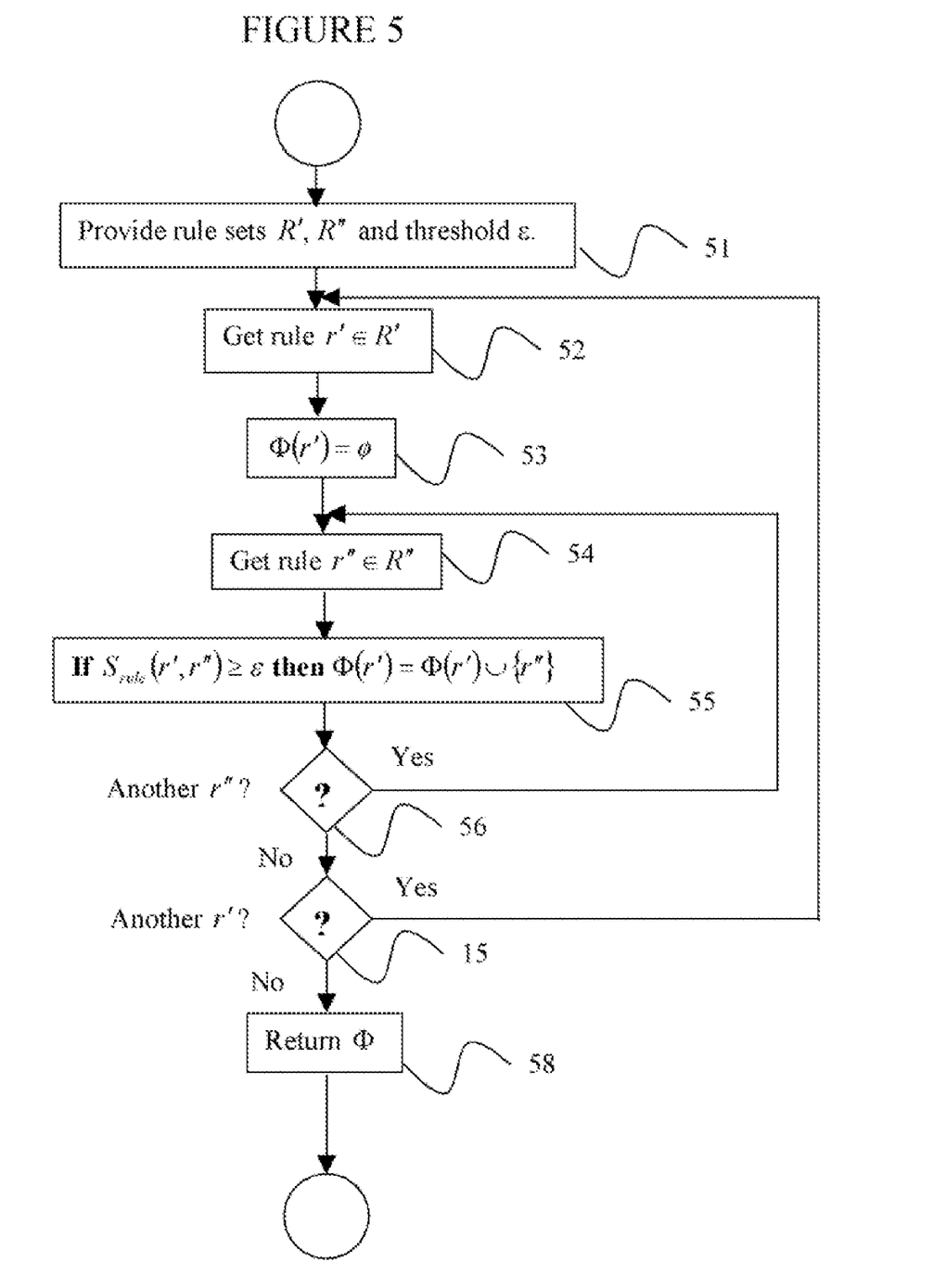
FIG. 5 is a flowchart of a method for computing a $\Phi$ mapping, according to an embodiment of the invention.

Computation of $\Phi$ Mappings:

The one→many $\Phi$ mappings determine for each PR(DR) rule in $P_1(P_2)$ which PR(DR) rules in $P_2(P_1)$ are very similar. Intuitively, two rules are similar when their targets and the conditions they specify are similar. Thus a $\Phi$ mapping can be defined as follows:

$$\Phi(r_i) = \{r_j | S_{rule}(r_i, r_j) \geq \epsilon\} \qquad (6)$$

where $S_{rule}$ is computed by EQ. 7, below, and $\epsilon$ is a threshold. The threshold term, allows calibration of the quality of the similarity approximation. It is expected that the actual value of the threshold will be very specific to the policy domain. FIG. 5 presents a flowchart summarizing the procedure for calculating a $\Phi$ mapping. This procedure takes as inputs two rule sets R' and R" and a threshold value $\epsilon$, and computes a mapping for each rule in R' based on EQ. 6. Referring to the FIG., the mapping algorithm starts at step 51 by providing the inputs R', R" and $\epsilon$. Then, at step 52, for each rule r'∈R', the $\Phi$ mapping is initialized to the empty set at step 53. Then, at step 54, for each rule r"∈R", if $S_{rule}(r',r'') \geq \epsilon$, then the rule r" is added to the $\Phi$ mapping: $\Phi(r') = \Phi(r') \cup \{r''\}$. The method checks for more rules r" at step 56, and for more rules r' at step 57. After all rules have been processed, the $\Phi$ mapping is returned at step 58.

Similarity Score between Rules:

Since the similarity measure serves as a lightweight filter phase, it should not involve complicated analysis of boolean expressions. The similarity measure is developed based on the intuition that rules $r_i$ and $r_j$ are similar when both apply to similar targets and both specify similar conditions on request attributes, i.e. they are structurally similar. Specifically, the rule similarity function $S_{rule}$ between two rules $r_i$ and $r_j$ is computed as follows:

$$S_{rule}(r_i, r_j) = w_t S_t(r_i, r_j) + w_c S_c(r_i, r_j), \qquad (7)$$

where $w_t$ and $w_c$ are weights that can be used for emphasizing the importance of the target or condition similarity, respectively. For example, if users are more interested in finding policies applied to similar targets, they can increase w to achieve this purpose. The weights satisfy the constraint $w_t + w_c = 1$. $S_t$ and $S_c$ are functions that compute a similarity score between two rules based on the comparison of their Target and Condition elements, respectively.

As the Target element in each rule contains the Subject, Resource and Action elements, each of these elements in turn contains predicates on the respective category of attributes. Thus, the Target similarity function $S_t$ is computed as follows:

$$S_t(r_i, r_j) = w_s S_s(r_i, r_j) + w_r S_r(r_i, r_j) + w_a S_a(r_i, r_j). \qquad (8)$$

In EQ. 8, $w_s$, $w_r$, $w_a$ represent weights that are assigned to the corresponding similarity scores. As in the previous equations, weight values need to satisfy the constraint $w_s + w_r + w_a = 1$. $S_s$, $S_r$ and $S_a$ are functions that return a similarity score based on the Subject, Resource and Action attribute predicates respectively in the Target elements of the two given rules.

The computation of functions $S_c$, $S_s$, $S_r$ and $S_a$ involves the comparison of pairs of predicates in the given pair of rule elements, which is discussed, in detail in the next subsection.

Similarity Score of Rule Elements:

Each of the rule elements Subject, Resource, Action and Condition is represented as a set of predicates in the form of $\{attr\_name_1 \oplus_1 attr\_value_1, attr\_name_2 \oplus_2 attr\_value_2, K\}$, where attr_name denotes the attribute name, $\oplus$ denotes a comparison operator and attr_value represents an attribute value. It is assumed that there are no syntactic variations for the same attribute name. For example, there cannot exist attribute names "emp-name", "EmpName" in different policies all of which refer to the employee name attribute. The unification of the attribute names can be done using one of the many existing approaches that have been developed for schema matching.

Based on the type of attribute values, predicates are divided into two categories, namely categorical predicates and numerical predicates.

Categorical predicate: The attribute values of this type of predicate are categorical data that belong to some domain-specific ontology. Predicates like "Designation=Professor" and "FileType=Documentation" belong to the categorical type.

Numerical predicate: The attribute values of this type of predicate belong to integer, real, or date/time data types. For example, predicates "FileSize<10 MB", "Time=12:00" are of numerical type.

The similarity score between two rules $r_i$ and $r_j$ regarding the same element is denoted as $S_{<Element>}$, where <Element> refers to 'c' (condition), 's' (subject), 'r' (resource) or 'a' (action). The $S_{<Element>}$ is computed by comparing the corresponding predicate sets in two rules. There are three steps. First, the predicates are clustered for each rule element according to the attribute names. It is worth noting that one attribute name may be associated with multiple values. Second, one finds the predicates in the two rules whose attribute names match exactly and then proceed to compute a similarity score for their attribute values. The way similarity score are computed between attribute values differs, depending on whether the attribute value is of categorical type or numerical type (details of computation is covered in the following subsection). Finally, the scores of each pair of matching predicates are summed to obtain the similarity score of the rule element. Since not all attributes in one rule can find a match in the other, a penalty is included for this case by dividing the sum of similarity scores of matching pairs by the maximum number of attributes in a rule. Note that a match can be a syntactic match, or can be a synonym discoverable in an electronic dictionary or an ontology.

In addition, there is a special case when the element set is empty in one rule, which means no constraint exists for this element. For this case, the similarity of the elements of the two rules is considered to be 0.5 due to the consideration that one rule is a restriction of the other and the 0.5 is the estimation of the average similarity.

The formal definition of $S_{<Element>}$ is given by EQ. 9:

$$S_{\langle Element \rangle}(r_i, r_j) = \begin{cases} \dfrac{\sum_{(a_{1k}, a_{2l}) \in M_a} S(a_{1k}, a_{2l})}{\max(N_{a_1}, N_{a_2})}, & N_{a_1} > 0 \text{ and } N_{a_2} > 0, \\ 1, & \text{otherwise.} \end{cases} \quad (9)$$

In EQ. 9, $M_a$ is a set of pairs of matching predicates with the same attribute names, $a_{1k}$ and $a_{2l}$ are attributes of rules $r_{1i}$ and $r_{2j}$ respectively, $S_{<attr\_typ>}$ is the similarity score of attribute values of the type attr_typ, and $N_{a1}$ and $N_{a2}$ are the numbers of distinct predicates in the two rules respectively.

In addition, the computation of the similarity score of two policy targets $S_T$ is the same as that for the rule targets i.e., $S_r$.

Similarity Score for Categorical Predicates:

For the categorical values, one should not only consider the exact match of two values, but also consider their semantic similarity. For example, consider policy $P_1$ talking about the priority of professors, policy $P_2$ talking about faculty members, and policy $P_3$ talking about business staff. In some sense, policy $P_1$ is more similar to policy $P_2$ than to policy $P_3$ because "professors" is a subset of "faculty members" which means that policy $P_1$ could be a restriction of policy $P_2$. Based on this observation, the approach assumes that a hierarchy relationship exists for the categorical values.

The similarity between two categorical values (denoted as $S_{cat}$) is then defined according to the shortest path of these two values in the hierarchy. The formal definition is shown below:

$$s_{cat}(v_1, v_2) = 1 - \frac{SPath(v_1, v_2)}{2H}, \quad (10)$$

where SPath $(v_1, v_2)$ denotes the length of the shortest path between two values $v_1$ and $v_2$, and H is the height of the hierarchy. In EQ. 10, the length of the shortest path of two values is normalized by the possible maximum path length which is 2H. The closer the two values are located in the hierarchy, the more similar the two values will be, and hence a higher similarity score $S_{cat}$ will be obtained.

Figure 6:
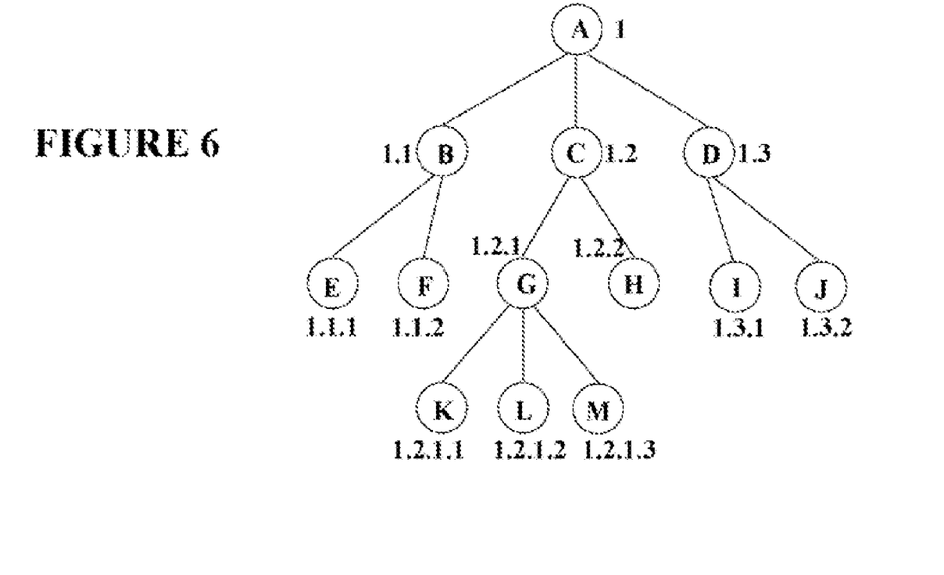
FIG. 6 depicts an exemplary hierarchy, according to an embodiment of the invention.

FIG. 6 illustrates an example hierarchy, where each node represents a categorical value. A single tree graph represents the categorical values for both attributes. The height of the hierarchy is 3, and the length of maximum path of two values is estimated as 2×3=6 (the actual maximum path in the figure is 5 due to the imbalance of the hierarchy). The SPath (E,B) is 1, and the SPath (E,F) is 2. According to EQ. 10, the similarity score of nodes E and B is 1−(1/6) =0.83, and the similarity score of nodes E and F is 1−(2/6)=0.67. From the obtained scores, one can observe that E is more similar to B than to F. The underlying idea is that the parent-child relationship (B and E) implies one rule could be a restriction for the other and this would be more helpful than the sibling relationship (E and F) in rule integration.

To avoid repeatedly searching the hierarchy tree for the same value during the shortest path computation, each node is assigned a hierarchy code (Hcode), indicating the position of each node. In particular, the root node is assigned an Hcode equal to '1', and its children nodes are named in the order from left to right by appending their position to the parent's Hcode with a separator '.', where there will be Hcodes like '1.1' and '1.2'. The process continues till the leaf level is reached. The number of elements separated by '.' is equal to the level at which a node is located. From such Hcodes one can compute the length of shortest path between two nodes. Two Hcodes are compared element by element until either the end of one Hcode is reached or there is a difference. The common elements correspond to the same shared parent nodes, and the number of different elements correspond to the levels that need to be generalized to their common parent node. Therefore, the shortest path is the total number of different elements in two Hcodes. For example, the length of the shortest path from node '1.1' to '1.2' is 2, as there are two different elements in the Hcodes.

Note that the definition of $S_{cat}$ can be applied to categorical values which do not lie in a hierarchy. In that case, if two values are matched, their shortest path SPath is 0 and their similarity score will be 1, otherwise, SPath is infinity and their similarity score becomes 0.

Having introduced the approach to compare two single values, the discussion can be extended to two sets of values. Suppose there are two attributes $a_1$:($v_{11}$, $v_{12}$, $v_{13}$, $v_{14}$) and $a_2$:{$v_{21}$, $v_{22}$, $v_{23}$}, where $a_1$ and $a_2$ are the attribute names belonging to policy $P_1$ and $P_2$ respectively, and values in the brackets are corresponding attribute values. Note that the listed values belonging to the same attribute are different from one another. The similarity score of the two attribute value sets is the sum of similarity scores of pairs <$v_{1k}$, $v_{2l}$> and a compensating score δ for non-matching attribute values.

Obviously, there could be many combinations of pairs. It is desired to find a set of pairs, denoted as $M_v$, which have the following properties:
1. If $V_{1k}=V_{2l}$, then $(V_{1k}, V_{2l}) \in M_v$.
2. For pairs $v_{1k} \neq v_{2l}$, pairs contributing to the maximum sum of similarity scores belong to $M_v$.
3. Each attribute value $v_{1k}$ or $v_{2l}$ occurs at most once in $M_v$.

Figure 7:
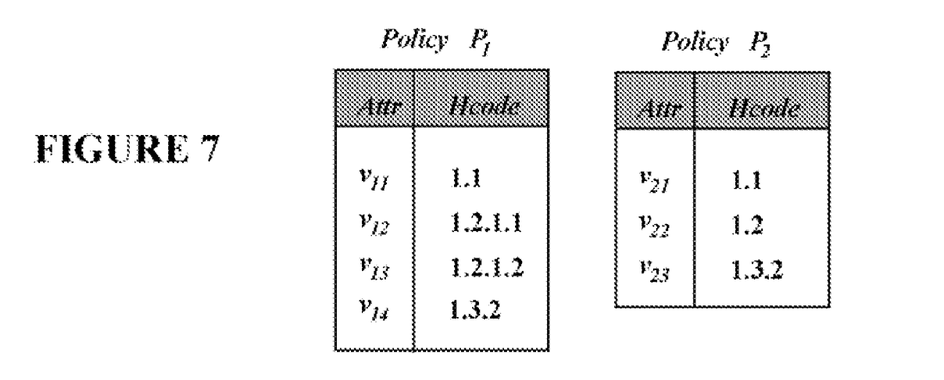
FIG. 7 depicts tables illustrating hierarchy codes for the hierarchy of FIG. 6, according to an embodiment of the invention.

The process of finding the pair set $M_v$ is the following. First, obtain the hierarchy code for each attribute value. See FIG. 7 for an example of these values for the example hierarchy shown in FIG. 6. Then compute the similarity between pairs of attribute values with the help of the hierarchy code.

Figure 8:
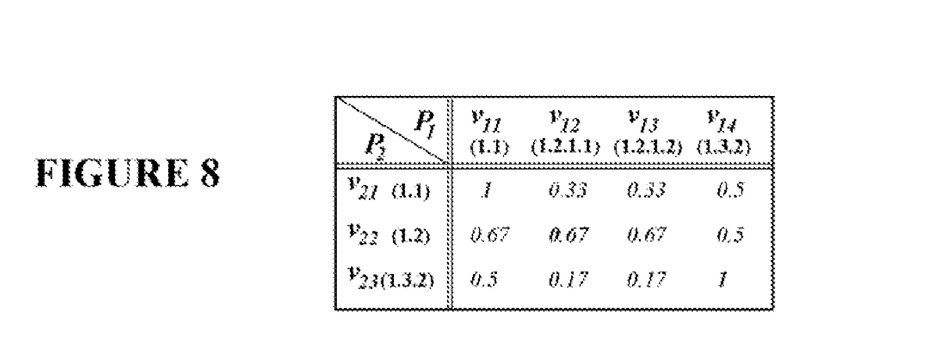
FIG. 8 depicts a table of similarity scores of 2 sets of attributes, according to an embodiment of the invention.

FIG. 8 shows the resulting scores for the example. Next, pick out the exactly matched pairs, which are $<v_{11}, v_{21}>$ end $<v_{14}, v_{23}>$ in the example. For the remaining attribute values, find pairs that maximize the sum of similarity scores of pairs. In this example, $<V_{12}, V_{22}>$ has the same similarity score as $<v_{13}, v_{22}>$, and hence one needs to further consider which choice can lead to a greater compensating score. The compensating score $\delta$ is for attribute values which do not have matches when two attributes have a different number of values. $\delta$ is computed as the average similarity score between unmatched values with all the values of the other attribute. For this example, no matter which pair is chosen, the compensating score is the same. Suppose the pair $<v_{12}, v_{22}>$ is chosen. This leaves one value $v_{13}$ left whose compensating score $\delta$ is $(0.33+0.67+0.17)/3=0.39$.

Finally, the similarity score for the two attribute $a_1$ and $a_2$ takes into account both the similarity of attribute names and attribute values. Specifically, the similarity score for attribute names is 1 since they are exactly matched, and the similarity score for attribute values is the average of the scores of the pairs and the compensating score. The final score is $(\frac{1}{2})[1+(1+1+0.67+0.39)/4]=0.88$.

The similarity score of two categorical predicates is defined as follows:

$$S_{cat}(a_1, a_2) = \frac{1}{2}\left[1 + \frac{\sum_{(v_{1k},v_{2l}) \in M_v} s_{cat}(v_{1k}, v_{2l}) + \delta}{\max(N_{v_1}, N_{v_2})}\right], \quad (11)$$

$$\delta = \begin{cases} \frac{\sum_{(v_{1k},\_) \notin M_v} \sum_{l=1}^{N_{v_2}} s_{cat}(v_{1k}, v_{2l})}{N_{v_2}}, & N_{v_1} > N_{v_2}, \\ \frac{\sum_{(\_,v_{2l}) \notin M_v} \sum_{k=1}^{N_{v_1}} s_{cat}(v_{1k}, v_{2l})}{N_{v_1}}, & N_{v_2} > N_{v_1}, \end{cases} \quad (12)$$

where $N_{v_1}$ and $N_{v_2}$ are the total numbers of values associated with attributes $a_1$ and $a_2$ respectively.

Similarity Score for Numerical Predicates:

Unlike categorical values, numerical values do not have any hierarchical relationship. For computation efficiency, the similarity of two numerical values $v_1$ and $v_2$ is defined based on their difference as shown in EQ. 13:

$$s_{num}(v_1, v_2) = 1 - \frac{|v_1 - v_2|}{\max(v_1, v_2)}. \quad (13)$$

The $s_{num}$ tends to be large when the difference between two values is small.

The computation of the similarity score of two numerical value sets is similar to that for the two categorical value sets, and there is thus the following similarity definition for numerical predicates:

$$s_{num}(a_1, a_2) = \frac{1}{2}\left[1 + \frac{\sum_{(v_{1k},v_{2l}) \in M_v} s_{num}(v_{1k}, v_{2l}) + \delta}{\max(N_{v_1}, N_{v_2})}\right], \quad (14)$$

$$\delta = \begin{cases} \frac{\sum_{(v_{1k},\_) \notin M_v} \sum_{l=1}^{N_{v_2}} s_{num}(v_{1k}, v_{2l})}{N_{v_2}}, & N_{v_1} > N_{v_2}, \\ \frac{\sum_{(\_,v_{2l}) \notin M_v} \sum_{l=1}^{N_{v_1}} s_{num}(v_{1k}, v_{2l})}{N_{v_1}}, & N_{v_2} > N_{v_1}. \end{cases} \quad (15)$$

Figure 9:
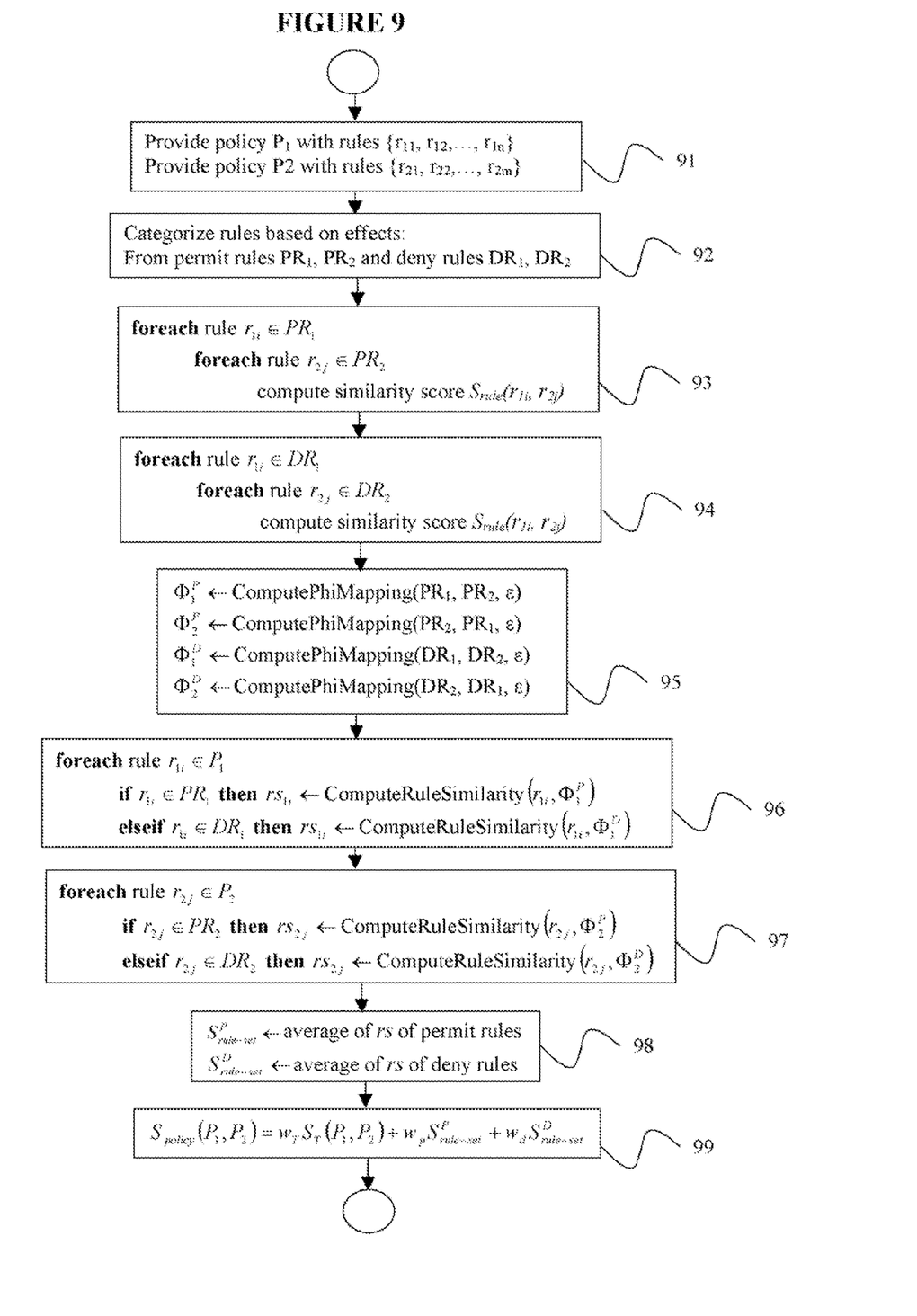
FIG. 9 is a flowchart of a method for computing a policy similarity measure, according to an embodiment of the invention.

Overall Algorithm:

The steps involved in the computation of a similarity score between two policies $P_1$ and $P_2$ are illustrated in the flowchart of FIG. 9. Referring to FIG., the algorithm takes as arguments at step 91 a policy $P_1$ with n rules $\{r_{11}, r_{12}, \ldots, r_{1n}\}$, and a policy $P_2$ with m rules $\{r_{21}, r_{22}, \ldots, r_{2m}\}$.

The algorithm includes five phases. In a first phase, the rules in $P_1$ and $P_2$ are categorized at step 92 based on their effects as either permit or deny rules.

Second, the similarity score $S_{rule}$ is computed for each pair of rules in $P_1$ and $P_2$, where $S_{rule}$ is defined by EQ. (7). The similarity of each permit rule of $P_1$ with each permit rule of $P_2$ is calculated at step 93, and the similarity of each deny rule of $P_1$ with each deny rule of $P_2$ is calculated at step 94.

In the third phase, based on the $S_{rule}$, the $\Phi$ mappings $\Phi_1^P$, $\Phi_1^D$, $\Phi_2^P$ and $\Phi_2^D$ are computed at step 95. The function ComputePhiMapping is illustrated in the flow chart of FIG. 5 that implements EQ. 6.

Fourth, the $\Phi$ mappings are used to calculate the rule set similarity scores. At step 96, the rule similarity score is computed for each rule in $P_1$ with the rules in $\Phi_1^P$ and $\Phi_1^D$. At step 97, the rule similarity score is computed for each rule in $P_2$ with the rules in $\Phi_2^P$ and $\Phi_2^D$. The function ComputeRuleSimilarity is defined by EQ. (1) for the rules in policy $P_1$, step 96, and by EQ. (2) for the rules in policy $P_2$, step 97. The overall rule similarity scores for the permit rules and deny rules are calculated at step 98 by averaging the respective rule similarity scores. The similarity of the permit rules is defined by EQ. (3), and the similarity of the deny rules is defined by EQ. (4). Finally, in the fifth phase, the overall similarity score is obtained at step 99 by weighting the similarities of the permit and deny rules with the Target similarity score, as defined by EQ. (5). The Target similarity can be calculated similarly to that of the Target elements of two rules, as defined by EQ. (8).

The most computationally expensive part of the algorithm is the computation of $S_{rule}$. $S_{rule}$ is the sum of similarity scores of corresponding elements. Suppose the average number of attributes in one element is $n_a$. To find matching attributes with the same name, it takes $O(n_a \log n_a)$ to sort and compare the list of attribute names. For each pair of matching attributes, compute the similarity scores of attribute values. Generally speaking, one attribute name is associated with one or very few number of values (e.g. 10). Therefore, the time for the attribute value computation can be estimated to be a constant time c. Then the complexity of computing a similarity score of two elements is $O(n_a \log n_s + n_a C)$. For each rule, there are at most 5 elements, and the computation complexity of $S_{rule}$ is still $O(n_a \log n_a)$. This is not the only similarity measure possible. Other comparisons can be made. For example, instead of matching exact attribute names one can use a dictionary to look for synonyms. This will add little cost to the computation. In other words, extensions or changes to the similarity measure, as long as they are not more the O(n log n), can be added. Other techniques, like synonyms matching from information retrieval could be incorporated into the measure.

It is to be understood, however, that a policy similarity measure according to an embodiment of the invention does not require the rules to be restricted to "permit" and "deny" rules, but can apply to any kind of rule that is structured into identifiable sections where the same sections in two rules are compared with a similarity measure. For example, if rules have the form WHEN Event IF Condition THEN Action, the same methodology can be applied, i.e. for two rules WHEN Event1 IF Condition1 THEN Action1 and WHEN Event2 IF Condition2 THEN Action2, similarity measure can foe defined to get $S_a$(Event1,Event2), $S_c$(Condition1, Condition2) if Action1=Action2. Instead of performing an exact comparison, one can create a similarity measure to establish similarities. One can also create a similarity measure between actions so that when the difference between the actions is not clear cut like in the case of Permit/Deny a comparison can still be performed. For example, if there is a policy that says: IF Response time of Application A is <10 millsec in the next hour THEN Add servers to serve Application A, it can be compared with a policy that says: IF subscribers of Application A are more than 1000 this month THEN Add resources to Application A. Thus, although the actions are not the same, they are similar, in that they allocate more resources. Note also that these are system management policies, so a policy similarity measure according to an embodiment of the invention applies not only to security policies but to also to system management and administration management polices.

Case Study

In this section is provided an example to illustrate how a policy similarity measure algorithm according to an embodiment of the invention works. Continuing with the policy examples $P_1$, $P_2$ and $P_3$ introduced above, the policy similarity algorithm assigns a similarity score between these policies. Furthermore, the similarity algorithm assigns a higher similarity score between the data owner policy $P_1$ and resource owner policy $P_2$ than between the data owner policy $P_1$ and resource owner policy $P_3$, adequately representing the relationship between the sets of requests permitted(denied) by the corresponding policies. Thus, using the similarity score computed by this algorithm according to an embodiment of the invention, the data owner can decide to host his/her data at the resource owner with policy $P_2$, which is more compatible to its own policy.

In the following discussion reference is made to the policies shown in FIGS. 2, 3 and 4. Without having any additional knowledge of the application, it can be assumed that each rule component has the same importance and has an equal weight in all computations.

The similarity score between $P_1$ and $P_2$ is calculated as follows.

1. The rules in $P_1$ and $P_2$ are categorized based on their effects to find the permit and deny sets, $PR_1$ ($PR_2$) and $DR_1$ ($DR_2$). These sets are:
   $PR_1$={R11};
   $PR_2$={R21, R22};
   $DR_1$={R12};
   $DR_2$={R23, R24}.

2. The rule similarity scores is computed between pairs of rules in both policies:
   S(R11, R21)=0.81;
   S(R11, R22)=0.56;
   S(R12, R23)=0.81;
   S(R12, R24)=0.76.

3. For policy P1, find the $\Phi$ mappings $\Phi_1^P$ and $\Phi_1^D$ using the ComputePhiMapping procedure. Using 0.7 as the threshold value for this example when computing the mappings, the $\Phi$ mappings obtained for policy $P_1$ are as follows:

$\Phi_1^P$={R11→{R21}}, $\Phi_1^D$={R12→{R23, R24}}.

4. The $\Phi$ mappings $\Phi_2^P$ and $\Phi_2^D$ are calculated similarly for policy P2.

$\Phi_2^P$={R21→{R11}, R22→{ }}, $\Phi_2^D$={R23→{R12}, R24→{R12}}.

5. For each rule in $r_{1i}$ in $P_1$ the rule similarity score $rs_{1i}$ is computed:

$$rs_{11} = S_{rule}(R11, R21) = 0.81;$$

$$rs_{12} = \frac{1}{2}[S_{rule}(R12, R23) + S_{rule}(R12, R24)] = 0.79.$$

6. Similarly, for each rule $r_{2j}$ the rule similarity score $rs_{2j}$ is computed:

$rs_{21} = S_{rule}(R21, R11) = 0.81;$ $rs_{22} = 0;$ $rs23 = S_{rule}(R23, R12) = 0.81;$ rs24=0.76.

7. The similarity between the permit rule sets of $P_1$ and $P_2$, given by $S_{rule-set}^P$, is computed:

$$S_{rule-ref}^P = \frac{rs_{11} + rs_{21} + rs_{22}}{3}$$
$$= \frac{0.81 - 0.81 + 0.0}{3}$$
$$= 0.54.$$

8. The similarity between the deny rule sets of $P_1$ and $P_2$, given by $S_{rule-set}^D$, is computed:

$$S_{rule-ref}^D = \frac{rs_{12} + rs_{23} + r_{24}}{3}$$
$$= \frac{0.79 + 0.81 + 0.76}{3}$$
$$= 0.79.$$

9. Finally the permit and deny rule set similarities and policy target similarities are combined to obtain the overall policy similarity score $S_1$, between policies $P_1$ and $P_2$;

$$S_{policy}(P_1, P_2) = \frac{1}{3}S_T + \frac{1}{3}S_{rule-ref}^P + \frac{1}{3}S_{rule-ref}^D$$

-continued $$= \frac{1}{3} \cdot 0.75 + \frac{1}{3} \cdot 0.54 + \frac{1}{3} \cdot 0.79$$
$$= 0.71.$$

The policy similarity score is then calculated for polices $P_1$ and $P_3$. The policy target similarity score $S_T=0.5$. The rule similarity scores for policies $P_1$ and $P_3$ are;

$$S(R11, R21)=0.7;$$

$$S(R12, R23)=0.66.$$

By using the threshold 0.7, the following $\Phi$ mappings are obtained:

$$\Phi_1^P = \{R11 \rightarrow \{R31\}\},$$

$$\Phi_1^D = \{R12 \rightarrow \{ \}\}.$$

Following the same steps as above, one can compute a policy similarity score $S_2$ between $P_1$ and $P_3$.

$$S_{policy}(P_1, P_3) = \frac{1}{3}S_T + \frac{1}{3}S_{rule-ref}^P + \frac{1}{3}S_{rule-ref}^D$$
$$= \frac{1}{3} \cdot 0.5 + \frac{1}{3} \cdot 0.7 + \frac{1}{3} \cdot 0.0$$
$$= 0.4.$$

Observe that policy $P_1$ is clearly more similar to policy $P_2$ when compared to policy $P_3$. Hence the data owner would choose to maintain data on the resource owner with policy $P_2$.

System Implementation

It is to foe understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method for determining similarity of two access control policies, the method performed by the computer comprising the steps of:
    providing a first policy with n rules;
    providing a second policy with m rules;
    categorizing the rules in each policy based on effect, wherein said rules are categorized as either permit rules or deny rules;
    calculating a rule similarity score for each permit rule in said first policy with each permit rule in said second policy;
    calculating a rule similarity score for each deny rule in said first policy with each deny rule in said second policy;
    for each rule in each policy, calculating a rule-set similarity score between said rule and the rules of similar effect in the other policy;
    averaging the rule-set similarity scores for all permit rules;
    averaging the rule-set similarity scores for all deny rules; and
    calculating a policy similarity score from a weighted sum of the average permit rule-set similarity score and the average deny rule-set similarity score,
    wherein said policy similarity score is indicative of the similarity of said first and second policies, wherein each said policy is a set of rules for determining access to and use of resources in an information system.

2. The method of claim 1, further comprising, for each rule in each policy, collecting in a phi mapping those rules of similar effect in the other policy, wherein said rule-set similarity scores are computed between a rule and those rules in its phi mapping.

3. The method of claim 2, wherein the phi mapping $\Phi(r_i)$ for a rule $r_i$ in one effect category of one policy is calculated from $$\Phi(r_i)=\{r_j|S_{rule}(r_i, r_j) \geq \epsilon\},$$

for each $r_j$ in the same effect category of the other policy, wherein $S_{rule}(r_i, r_j)$ represents the rule similarity score for rules $r_i$, $r_j$, and $\epsilon$ is a predetermined threshold.

4. The method of claim 2, wherein a rule-set similarity score between a rule $r_{1i}$ in one policy and other rules $r_j$ of similar effect in said other policy is calculated from $$\frac{\sum_{r_j \in \Phi_1^E(r_{1i})} S_{rule}(r_{1i}, r_j)}{|\Phi_1^E(r_{1i})|},$$

wherein $S_{rule}(r_{1i}, r_j)$ is said rule similarity score, $\Phi_1^E(r_{1i})$ is the phi mapping for rule $r_{1i}$ to other rules of effect E in the other policy, wherein the sum is over all rules $r_j$ in $\Phi_1^E(r_{1i})$, and $|\Phi_1^E(r_{1i})|$ is the cardinality of $\Phi_1^E(r_{1i})$.

5. The method of claim 1, wherein each policy comprises a target that includes a subject, a resource, and an action, wherein the method further comprises adding a weighted target similarity score between target elements of said first and second policies.

6. The method of claim 1, wherein each rule comprises a plurality of elements, including a subject element, a resource element, an action element, and a condition element, wherein each element is represented as a set of predicates in the form of $\{attr\_name_1, \oplus_1 attr\_value_1, attr\_name_2 \oplus_2 attr\_value_2, \ldots\}$, where attr_name denotes an attribute name, $\oplus$ denotes a comparison operator and attr_value represents an attribute value, wherein attribute values include categorical values or numerical values.

7. The method of claim 6, wherein calculating a rule similarity score between a rule in said first policy and a rule in said second policy comprises:
    finding those predicates in said two rules whose attribute names match, wherein a match is either a syntactic match or a synonym;
    for each predicate with matching attribute names, computing an attribute similarity score for the attribute values; and
    summing the attribute similarity scores for all pairs of matching predicates to obtain an element similarity score.

8. The method of claim 7, wherein if an element set is empty for one rule, setting the element similarity score to 0.5.

9. The method of claim 7, wherein said rule similarity score between rule $r_i$ in said first policy and rule $r_j$ in said second policy is a weighted sum of said element similarity scores, equivalent to the expression $$w_s S_s(r_i, r_j) + w_r S_r(r_i, r_j) + w_a S_a(r_i, r_j) + w_c S_c(r_i, r_j),$$

wherein $S_s$, $S_r$, $S_a$, and $S_c$ are the element similarity scores for the subject, resource, action and condition elements, respectively, and $w_s$, $w_r$, $w_a$, and $w_c$ are the respective weights, wherein a sum of the weights is one.

10. The method of claim 7, wherein calculating an attribute similarity score between two attributes, a first attribute associated with said first rule, and a second attribute associated with said second rule, each attribute having associated attribute value sets, comprises summing a similarity score for all attribute pairs $\{v_{1k}, v_{2l}\}$, wherein $v_{1k}$ is associated with said first attribute and $v_{2l}$ is associated with said second attribute, and a compensating score for non matching attribute values.

11. The method of claim 10, wherein an attribute similarity score for numerical attribute values $v_{1k}$, $v_{2l}$ is defined by an expression equivalent to $$\frac{1}{2}\left[1 + \frac{\sum_{(v_{1k}, v_{2l}) \in M_v} s_{num}(v_{1k}, v_{2l}) + \delta}{\max(N_{v_1}, N_{v_2})}\right],$$

wherein $$s_{num}(v_1, v_2) = 1 - \frac{|v_1 - v_2|}{\max(v_1, v_2)},$$

and $\delta$ is the compensating score defined as $$\delta = \begin{cases} \dfrac{\sum_{(v_{1k},\_) \notin M_v} \sum_{l=1}^{N_{v_2}} s_{num}(v_{1k}, v_{2l})}{N_{v_2}}, & N_{v_1} > N_{v_2}, \\ \dfrac{\sum_{(\_,v_{2l}) \notin M_v} \sum_{l=1}^{N_{v_1}} s_{num}(v_{1k}, v_{2l})}{N_{v_1}}, & N_{v_2} > N_{v_1}. \end{cases}$$

wherein $N_{v_1}$ and $N_{v_2}$ are the total number of values associated with said first and second attributes, respectively, and $M_v$ is a set of pairs of matched attribute values.

12. The method of claim 10, wherein calculating an attribute similarity score for attributes $a_1$, $a_2$ having categorical attribute values $v_{1k}$, $v_{2l}$ comprises:
representing the categorical attribute values of both attributes in a single hierarchical tree graph, wherein each node of said tree represents a categorical value;
representing each node with a hierarchy code indicative of the position of the node within the tree;
computing a similarity score between each pair of attribute values $v_{1k}$, $v_{2l}$ wherein $v_{1k}$ is an attribute of $a_1$ and $v_{2l}$ is an attribute of $a_2$;
summing similarity scores for those attribute value pairs with matching values;
summing similarity scores for the remaining attribute value pairs that maximize said sum of pair similarity scores;
adding a compensating score for unmatched attribute values, wherein said compensating score is an average of similarity scores between unmatched values with all other attribute values;
adding a similarity score for attribute names, wherein said similarity score for attribute values is an average of pair similarity scores and the compensating score.

13. The method of claim 12, wherein a similarity score between a pair of attribute values $v_1$, $v_2$ is computed from $$1 - \frac{SPath(v_1, v_2)}{2H},$$

where $SPath(v_1, v_2)$ denotes the length of a shortest path between values $v_1$ and $v_2$, and $H$ is a height of the hierarchy.

14. The method of claim 12, wherein said hierarchy code is defined with a root node assigned a code equal to '1', and child nodes are coded in order from left to right by appending their position to the parent's code with a separator '.'.

15. A computer-implemented method for determining similarity of two access control policies, the method performed by the computer comprising the steps of:
providing a first policy with n rules and a second policy with m rules, wherein each rule comprises a plurality of elements, including a subject element, a resource element, an action element, and a condition element that determines an effect of said rule, wherein each element is represented as a set of predicates in the form of $\{\text{attr\_name}_1 \oplus_1 \text{attr\_value}_1, \text{attr\_name}_2 \oplus_2 \text{attr\_value}_2, \ldots\}$, where attr_name denotes an attribute name, $\oplus$ denotes a comparison operator and attr_value represents an attribute value, wherein attribute values include categorical values or numerical values;
categorizing the rules in each policy based on effect, wherein said rules are categorized as either permit rules or deny rules;
for each rule $r_i$, in said first policy and each rule $r_j$, in said second policy of similar effect, finding those predicates in said pair of rules whose attribute names match, wherein a match is either a syntactic match or a synonym;
for each predicate with matching attribute names, computing an attribute similarity score for the attribute values;
summing the attribute similarity scores for all pairs of matching predicates to obtain an element similarity score; and
computing a rule similarity score $S_{rule}(r_i, r_j)$ for said pair of rules from a weighted sum of said element similarity scores,
wherein said rule similarity score is indicative of the similarity of said first and second policies, wherein each said policy is a set of rules for determining access to and use of resources in an information system.

16. The method of claim 15, further comprising:
for each rule in each policy, calculating a rule-set similarity score between said rule and the rules of similar effect in the other policy;
averaging the rule-set similarity scores for all permit rules;
averaging the rule-set similarity scores for all deny rules; and
calculating a policy similarity score from a weighted sum of the average permit rule-set similarity score and the average deny rule-set similarity score.

17. The method of claim 15, wherein said weighted sum of said element similarity scores is equivalent to the expression $$w_s S_s(r_i, r_j) + w_r S_r(r_i, r_j) + w_a S_a(r_i, r_j) + w_c S_c(r_i, r_j),$$

wherein $S_s$, $S_r$, $S_a$, and $S_c$ are the element similarity scores for the subject, resource, action and condition elements, respectively, and $w_s$, $w_r$, $w_a$, and $w_c$ are the respective weights, wherein a sum of the weights is one.

18. The method of claim 15, wherein a rule element similarity score between rules $r_i$ and $r_j$ is calculated from $$\begin{cases} \dfrac{\sum_{(a_{1k},a_{2l})\in M_a} S(a_{1k}, a_{2l})}{\max(N_{a_1}, N_{a_2})}, & N_{a_1} > 0 \text{ and } N_{a_2} > 0, \\ 1, & \text{otherwise,} \end{cases}$$

wherein $M_a$ is a set of pairs of matching predicates with the same attribute names, $a_{1k}$ and $a_{21}$ are attributes of rules $r_{1i}$ and $r_{2j}$ respectively, $S(a_{1k},a_{21})$ is the similarity score of attribute values of the attributes $a_{1k}$ and $a_{21}$, and $N_{a_1}$ and $N_{a_2}$, are the numbers of distinct predicates in said two rules respectively.

19. The method of claim 18, wherein an attribute similarity score for numerical attribute values $v_{1k}$, $v_{21}$ is defined by an expression equivalent to $$\frac{1}{2}\left[1 + \frac{\sum_{(v_{1k},v_{2l})\in M_v} s_{num}(v_{1k}, v_{2l}) + \delta}{\max(N_{v_1}, N_{v_2})}\right],$$

wherein $$s_{num}(v_1, v_2) = 1 - \frac{|v_1 - v_2|}{\max(v_1, v_2)},$$

and $\delta$ is a compensating score for non matching attribute values defined as $$\delta = \begin{cases} \dfrac{\sum_{(v_{1k},\_)\notin M_v} \sum_{l=1}^{N_{v_2}} s_{num}(v_{1k}, v_{2l})}{N_{v_2}}, & N_{v_1} > N_{v_2}, \\ \dfrac{\sum_{(\_,v_{2l})\notin M_v} \sum_{l=1}^{N_{v_1}} s_{num}(v_{1k}, v_{2l})}{N_{v_1}}, & N_{v_2} > N_{v_1}. \end{cases}$$

wherein $N_{v_1}$ and $N_{v_2}$ are the total number of values associated with said first and second attributes, respectively, and $M_v$ is a set of pairs of matched attribute values.

20. The method of claim 18, wherein an attribute similarity score for attributes $a_1$, $a_2$ with categorical attribute values $v_{1k}$, $v_{21}$ is defined by an expression equivalent to $$S_{cat}(a_1, a_2) = \frac{1}{2}\left[1 + \frac{\sum_{(v_{1k},v_{2l})\in M_v} S_{cat}(v_{1k}, v_{2l}) + \delta}{\max(N_{v_1}, N_{v_2})}\right],$$

wherein $$s_{cat}(v_1, v_2) = 1 - \frac{SPath(v_1, v_2)}{2H},$$

where $SPath(v_1, v_2)$ denotes the length of a shortest path between two values $v_1$ and $v_2$ in a hierarchical tree graph representing the categorical attribute values of both attributes wherein each node of said tree represents a categorical value, and H is the height of the hierarchy, and $\delta$ is a compensating score for non matching attribute values defined as $$\delta = \begin{cases} \dfrac{\sum_{(v_{1k},\_)\notin M_v} \sum_{l=1}^{N_{v_2}} S_{cat}(v_{1k}, v_{2l})}{N_{v_2}}, & N_{v_1} > N_{v_2}, \\ \dfrac{\sum_{(\_,v_{2l})\notin M_v} \sum_{l=1}^{N_{v_1}} S_{cat}(v_{1k}, v_{2l})}{N_{v_1}}, & N_{v_2} > N_{v_1}, \end{cases}$$

where $N_{v_1}$ and $N_{v_2}$ are the total numbers of values associated with attributes $a_1$ and $a_2$ respectively, and $M_v$ is a set of pairs of matched attribute values.

21. The method of claim 20, further comprising representing each node with a hierarchy code indicative of the position of the node within the tree, wherein a root node of said tree is assigned a code equal to '1', and child nodes are assigned codes in order from left to right by appending their position to the parent's code with a separator '.', and wherein a shortest path between two attribute values is a total number of different elements in the corresponding hierarchy codes.

22. The method of claim 20, wherein said set $M_v$ includes those attribute value pairs $(v_{1k}, v_{21})$ wherein $v_{1k}=v_{21}$ and those attribute value pairs $(v_{1k}, v_{21})$ wherein $v_{1k}\neq v_{21}$ whose attribute value similarity score maximizes a sum of attribute value similarity scores, wherein each attribute value $v_{1k}$, $v_{21}$ occurs at most once in $M_v$.

23. The method of claim 15, further comprising, for each rule in each policy, collecting in a phi mapping those rules of similar effect in the other policy, said phi mapping for a rule $r_i$ in one policy computed from $$\Phi(r_i)=\{r_j|S_{rule}(r_i, r_j)\geq \epsilon\},$$

for each $r_j$ in the same effect category of the other policy, wherein $S_{rule}(r_i,r_j)$ represents the rule similarity score for rules $r_i$, $r_j$, and $\epsilon$ is a predetermined threshold.

24. The method of claim 15, wherein if an element set is empty for one rule, setting the element similarity score to 0.5.

25. A program storage device readable by a computer, tangibly embodying a program of instructions executable by the computer to perform the method steps for determining similarity of two access control policies, said method comprising the steps of:
providing a first policy with n rules;
providing a second policy with m rules;
categorizing the rules in each policy based on effect, wherein said rules are categorized as either permit rules or deny rules;
calculating a rule similarity score for each permit rule in said first policy with each permit rule in said second policy;
calculating a rule similarity score for each deny rule in said first policy with each deny rule in said second policy;
for each rule in each policy, calculating a rule-set similarity score between said rule and the rules of similar effect in the other policy;
averaging the rule-set similarity scores for all permit rules;
averaging the rule-set similarity scores for all deny rules; and
calculating a policy similarity score from a weighted sum of the average permit rule-set similarity score and the average deny rule-set similarity score,
wherein said policy similarity score is indicative of the similarity of said first and second policies, wherein each said policy is a set of rules for determining access to and use of resources in an information system.

26. A program storage device readable by a computer, tangibly embodying a program of instructions executable by the computer to perform the method steps for determining similarity of two access control policies, said method comprising the steps of:

provide a first policy with n rules and a second policy with m rules, wherein each rule comprises a plurality of elements, including a subject element, a resource element, an action element, and a condition element that determines an effect of said rule, wherein each element is represented as a set of predicates in the form of $\{attr\_name_1 \oplus_1 attr\_value_1, attr\_name_2 \oplus_2 attr\_value_2, \ldots\}$, where attr_name denotes an attribute name, $\oplus$ denotes a comparison operator and attr_value represents an attribute value, wherein attribute values include categorical values or numerical values;

categorizing the rules in each policy based on effect, wherein said rules are categorized as either permit rules or deny rules;

for each rule $r_i$ in said first policy and each rule $r_j$ in said second policy of similar effect, finding those predicates in said pair of rules whose attribute names match, wherein a match is either a syntactic match or a synonym;

for each predicate with matching attribute names, computing an attribute similarity score for the attribute values;

summing the attribute similarity scores for all pairs of matching predicates to obtain an element similarity score; and computing a rule similarity score $S_{rule}(r_i, r_j)$ for said pair of rules from a weighted sum of said element similarity scores, wherein said rule similarity score is indicative of the similarity of said first and second policies, wherein each said policy is a set of rules for determining access to and use of resources in an information system.

27. A computer-implemented method for determining similarity of two policies, the method performed by the computer comprising the steps of:

providing a first policy with n rules and a second policy with m rules, wherein each rule is structured into a plurality of identifiable elements, including a event element, a condition element, and an action element, wherein each element is represented as a set of predicates in the form of $\{attr\_name_1 \oplus_1 attr\_value_1, attr\_name_2 \oplus_2 attr\_value_2, \ldots\}$, where attr_name denotes an attribute name, $\oplus$ denotes a comparison operator and attr_value represents an attribute value;

categorizing the rules in each policy based on action;

for each rule $r_i$ in said first policy and each rule $r_j$ in said second policy of similar effect, finding those predicates in said pair of rules whose attribute names match, wherein a match is either a syntactic match or a synonym;

for each predicate with matching attribute names, computing an attribute similarity score for the attribute values;

summing the attribute similarity scores for all pairs of matching predicates to obtain an element similarity score; and computing a rule similarity score $S_{rule}(r_i, r_j)$ for said pair of rules from a weighted sum of said element similarity scores, wherein said rule similarity score is indicative of the similarity of said first and second policies, wherein each said policy is a set of rules for determining access to and use of resources in an information system.

28. The method of claim 27, wherein categorizing the rules in each policy based on action comprises:

for each rule $r_i$ in said first policy and each rule $r_j$ in said second policy, finding those action predicates in said pair of rules whose attribute names match, wherein a match is either a syntactic match or a synonym;

for each predicate with matching attribute names, computing an attribute similarity score for the attribute values;

summing the attribute similarity scores for all pairs of matching predicates to obtain an action similarity score, wherein said rule is categorized based on said action similarity score.

* * * * *